(12) United States Patent
Sugawara

(10) Patent No.: US 9,804,478 B2
(45) Date of Patent: Oct. 31, 2017

(54) ILLUMINATION APPARATUS

(71) Applicant: CANON KABUSHIKI KAISHA, Tokyo (JP)

(72) Inventor: Azusa Sugawara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 290 days.

(21) Appl. No.: 14/666,661

(22) Filed: Mar. 24, 2015

(65) Prior Publication Data

US 2015/0286113 A1    Oct. 8, 2015

(30) Foreign Application Priority Data

Apr. 4, 2014    (JP) ................. 2014-077485

(51) Int. Cl.
*G03B 15/02*    (2006.01)
*G03B 15/05*    (2006.01)

(52) U.S. Cl.
CPC ...... *G03B 15/05* (2013.01); *G03B 2215/0592* (2013.01)

(58) Field of Classification Search
CPC ............ G03B 15/05; G03B 2215/0592; G03B 2215/0514; G03B 2215/0567; G03B 2215/0578; F21V 5/045; F21V 7/04; G02B 3/08
USPC ...... 362/16, 268, 309, 311.12, 18; 396/155–206; 359/619–628, 742–743, 359/599, 707
See application file for complete search history.

(56) References Cited

U.S. PATENT DOCUMENTS

| 3,488,486 A | 1/1970 | Bretthauer |
| 5,602,605 A * | 2/1997 | Lierle .................... G03B 15/05 362/18 |
| 5,852,751 A * | 12/1998 | Kawabata ............. G03B 15/05 362/16 |
| 6,011,929 A * | 1/2000 | Fuke ........................ F21V 5/02 362/16 |
| 6,807,369 B1 | 10/2004 | Tenmyo |
| 8,348,502 B2 | 1/2013 | Nakagawa |
| 2010/0329302 A1* | 12/2010 | Nakagawa ............ G01J 5/0003 374/130 |

FOREIGN PATENT DOCUMENTS

| CN | 1170147 A | 1/1998 |
| CN | 1177122 A | 3/1998 |
| CN | 1133096 C | 12/2003 |
| CN | 101225930 A | 7/2008 |

(Continued)

OTHER PUBLICATIONS

Feb. 23, 2017 Chinese Official Action in Chinese Patent Appln. No. 201510128986.5.

(Continued)

*Primary Examiner* — Elmito Breval
*Assistant Examiner* — Naomi M Wolford
(74) *Attorney, Agent, or Firm* — Fitzpatrick, Cella, Harper & Scinto

(57) ABSTRACT

An illumination apparatus includes a light emitting unit, a first optical member arranged in front of the light emitting unit and including a first fresnel shape having condensing action, and a second optical member including a second fresnel shape having light diffusing action so as to face the first fresnel shape of the first optical member.

8 Claims, 9 Drawing Sheets

(56) References Cited

FOREIGN PATENT DOCUMENTS

| CN | 101937158 A | 1/2011 |
|---|---|---|
| JP | 11-344749 A | 12/1999 |
| JP | 2000-298244 A | 10/2000 |
| JP | 2002-169202 A | 6/2002 |
| JP | 2010-134080 A | 6/2010 |
| JP | 4592933 B2 | 9/2010 |
| JP | 2011-028232 A | 2/2011 |

OTHER PUBLICATIONS

Aug. 2, 2017 Chinese Official Action in Chinese Patent Appln. No. 201510128986.5.

* cited by examiner

ILLUMINATION APPARATUS

BACKGROUND OF THE INVENTION

Field of the Invention

The invention is related to an illumination apparatus.

Description of the Related Art

Conventionally, in a flash apparatus being an illumination apparatus with variable irradiation angles, a wide panel detachably inserted into a front surface of a light emitting window and a light diffusing adapter detachably attached to the light emitting window are arranged so as to correspond to an angle of view of a super wide angle lens, and emitting light from a light emitting unit is diffused at a super wide angle. An optical action surface including a plurality of quadrangular pyramid protruding portions, on which diffusing process is carried out so as to have diffusing characteristics, is formed on a region corresponding to the light emitting window in a surface on a light emitting unit side of the wide panel and the light diffusing adapter.

For example, in Japanese Patent No. 4592933, a light diffusing adapter covering a light emitting window includes a region corresponding to the light emitting window and a pair of bending portions extending backward from both sides of the region corresponding to the light emitting window. A group of quadrangular pyramid protruding portions is formed on a region corresponding to the light emitting window on a light emitting unit side and a region near the bending portions on an object side.

In Japanese Patent Laid-Open No. 11-344749, a region corresponding to a light emitting window of a light diffusing adapter on an object side is a curved surface. Steps are formed on a region on a light emitting unit side so that all distances from the curved surface on the object side are equal, and a group of quadrangular pyramid protruding portions is formed on each step.

However, in conventional arts disclosed in Japanese Patent No. 4592933 and Japanese Patent Laid-Open No. 11-344749, since a power diffused by a quadrangular pyramid shape is strong, luminance at a center of a screen (hereinafter referred to as "guide number") drastically decreases.

SUMMARY OF THE INVENTION

In view of foregoing, the invention provides an illumination apparatus capable of realizing irradiation angles in order to satisfy an angle of view of a super wide angle lens and enhancing a guide number.

An illumination apparatus as one aspect of the invention includes a light emitting unit, a first optical member arranged in front of the light emitting unit and including a first fresnel shape having condensing action, and a second optical member including a second fresnel shape having light diffusing action so as to face the first fresnel shape of the first optical member.

Further features of the present invention will become apparent from the following description of exemplary embodiments with reference to the attached drawings.

DESCRIPTION OF THE PREFERRED EMBODIMENTS

Figure 1:
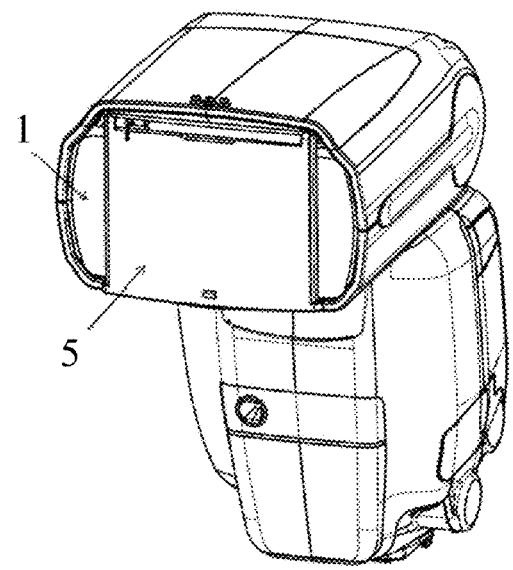
FIG. 1 is an appearance perspective view of a flash apparatus according to an embodiment of the invention.

Exemplary embodiments of the invention will be described below with reference to the accompanied drawings. In each of the drawings, the same elements will be denoted by the same reference numerals and the duplicate descriptions thereof will be omitted. A flash apparatus being an illumination apparatus in this embodiment is usable by being detachably attached to an image pickup apparatus (not illustrated).

Figure 2:
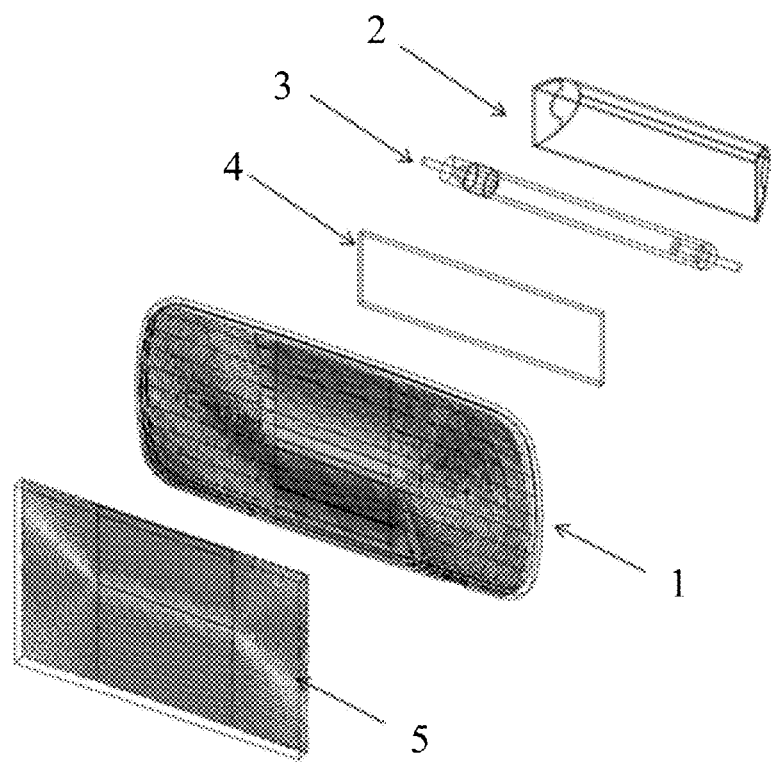
FIG. 2 is an exploded perspective view of a main optical system of the flash apparatus.
Figure 3A:
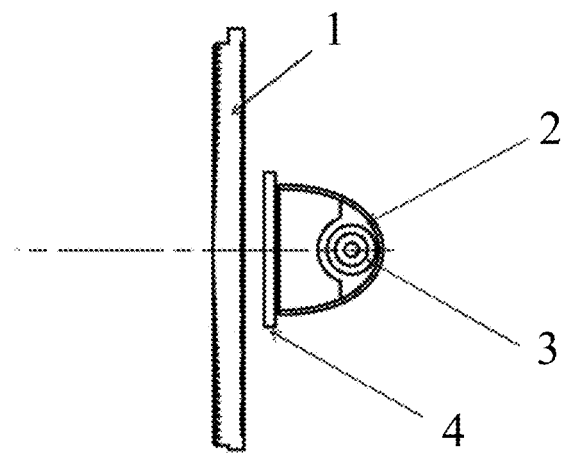
FIGS. 3A and 3B are vertical sectional views of a main optical system of the flash apparatus.
Figure 3B:
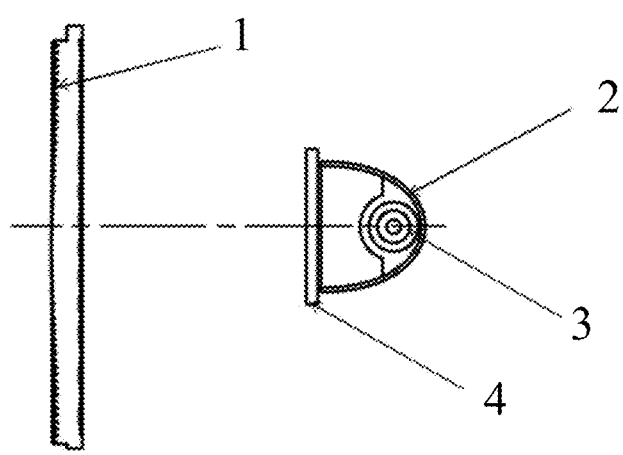
Figure 4A:
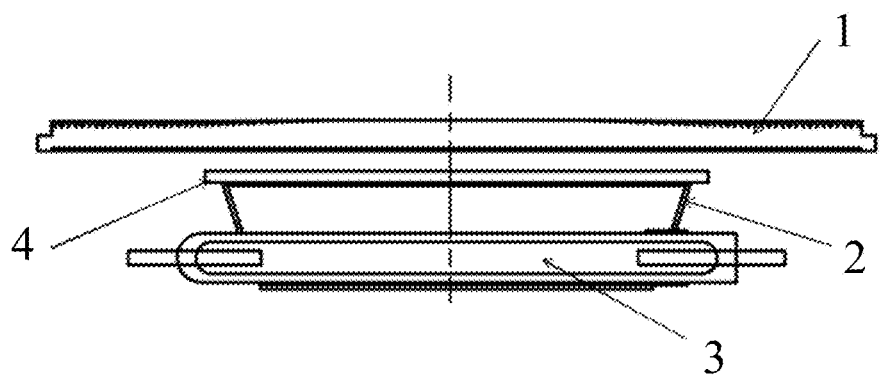
FIGS. 4A and 4B are horizontal sectional views of a main optical system of the flash apparatus.
Figure 4B:
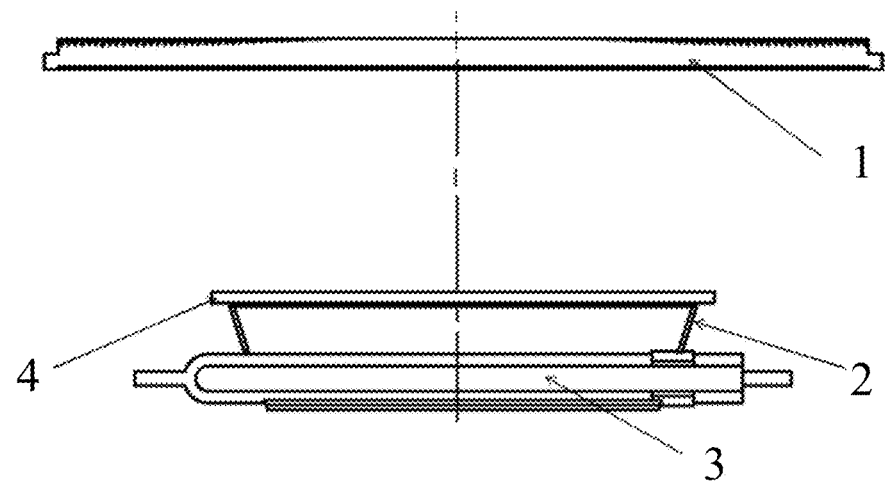
Figure 5A:
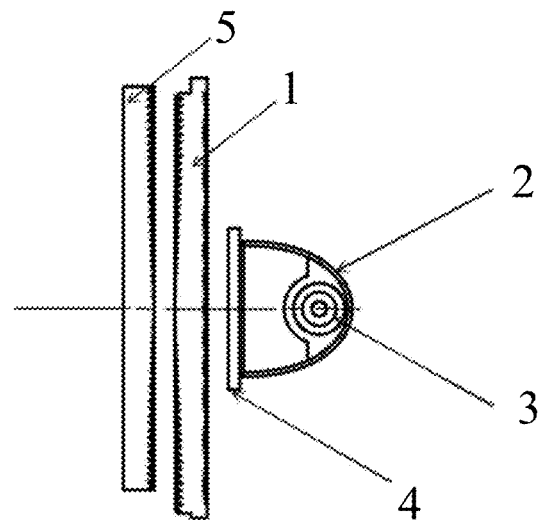
FIGS. 5A and 5B are sectional views of a main optical system of the flash apparatus when using a second optical member.
Figure 5B:
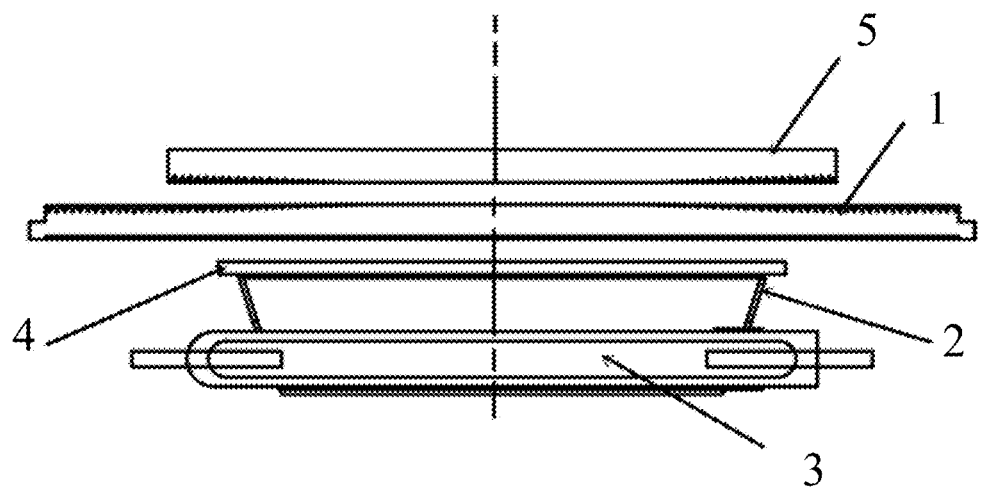

First, a main optical system of a light emitting unit of the flash apparatus is explained using FIGS. 1 to 5B. FIG. 1 is an appearance perspective view of the flash apparatus according to this embodiment of the invention. FIG. 2 is an exploded perspective view of the main optical system of the flash apparatus. FIGS. 3A and 3B are vertical sectional views of the main optical system of the flash apparatus. FIG. 3A illustrates a state where the image pickup apparatus is a wide state, and FIG. 3B illustrates a state where the image pickup apparatus is a telephoto state. FIGS. 4A and 4B are horizontal sectional views of the main optical system of the flash apparatus. FIG. 4A is a state where the image pickup apparatus is a wide state, and FIG. 4B is a state where the image pickup apparatus is a telephoto state. FIGS. 5A and 5B are sectional views of the main optical system of the flash apparatus when using a second optical member 5. The image pickup apparatus is then in the wide state. FIG. 5A is a vertical sectional view, and FIG. 5B is a horizontal sectional view.

The flash apparatus includes a first optical member 1, a reflector 2, a flash discharge tube 3, a protecting panel 4, and the second optical member 5. The first optical member 1 is fixed so as to face a light emitting unit of the flash apparatus including the reflector 2 and the flash discharge tube 3. The first optical member 1 condenses light flux emitted from the flash discharge tube 3, or uniformly diffuses it. The reflector 2 uniformly condenses the light flux emitted at a predetermined angle from the flash discharge tube 3. An inner surface side of the reflector 2 where the flash discharge tube 3 is arranged is made of a brightening aluminum material having high reflectance or a mold material evaporated by a material having high reflectance. The protecting panel 4 is arranged in front of the light emitting unit and is made of a high heat resisting material such as a glass. The protecting panel 4 prevents degradation of optical characteristics by preventing dust and dirt from entering into an inside of the light emitting unit, and prevents the first optical member 1 from directly being exposed to radiating heat from the flash discharge tube 3. The second optical member 5 is a wide panel arranged in front of the first optical member 1 so as to correspond to an angle of view of a super wide angle lens. The super wide angle lens indicates a lens having a focal length of 20 mm or less.

The reflector 2, the flash discharge tube 3, and the protecting panel 4 are integrally held so that a position relationship is maintained. As illustrated in FIGS. 3A to 4B, the first optical member 1 and the light emitting unit are movable so as to vary a relative distance between them taken along an optical axis. The second optical member 5 has light diffusing action so as to increase irradiation angles. The second optical member 5 is rotatably attached so that it is drawn from the flash apparatus as illustrated in FIG. 1 so as to be arranged in front of the first optical member 1 when it is used, and is housed in the flash apparatus when it is not used. The flash apparatus is capable of diffusing flash light and varying irradiation angles corresponding to an angle of view of the image pickup apparatus by a variation of a relative distance between the first optical member 1 and the light emitting unit and an arrangement of the second optical member 5 according to a focal length of an image pickup lens (not illustrated) attached to the image pickup apparatus. Additionally, each member excluding the second optical member 5 is held by a holder (not illustrated). This holder is made of a heat resisting mold member, and holds a driver of the reflector 2 and the flash discharge tube 3 so as to prevent emission of light flux in an unnecessary direction.

Figure 6:
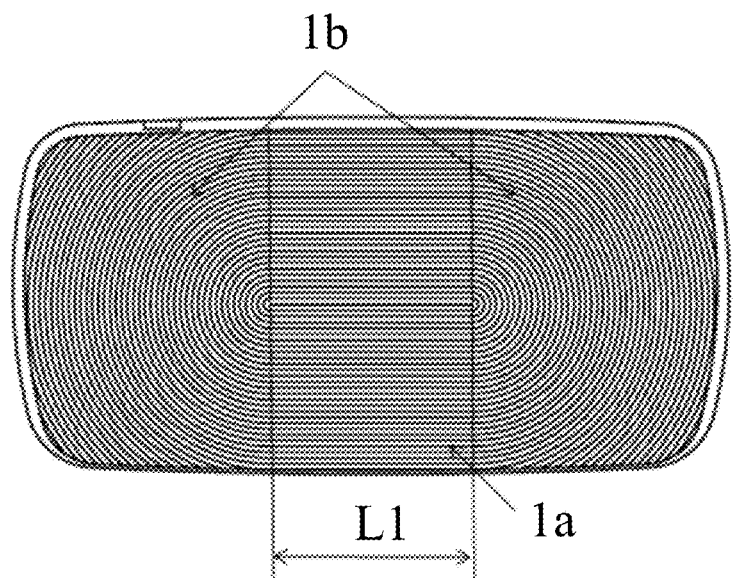
FIG. 6 is a schematic diagram illustrating a fresnel lens formed on a first optical member.

Next, a fresnel lens formed on an object side of the first optical member 1 is explained in detail using FIG. 6. A fresnel shape formed on the object side of the first optical member 1 includes a first condensing portion 1a and a second condensing portion 1b. The first condensing portion 1a is formed so as to only have condensing action relative to a direction perpendicular to a longitudinal direction of the flash discharge tube 3. The second condensing portion 1b is annularly formed on both sides of the first condensing portion 1a. A focal length of the fresnel lens formed on the first and second condensing portions 1a and 1b is 22.5 mm. The first condensing portion 1a may have condensing action relative to the longitudinal direction of the flash discharge tube 3 if condensing action relative to the direction perpendicular to the longitudinal direction of the flash discharge tube 3 is stronger than condensing action relative to the longitudinal direction thereof.

In an optical system where a focal length is short and a moving amount according to a variation of irradiation angles is small as the fresnel lens formed on the object side of the first optical member 1, a phenomenon in which an image of the flash discharge tube 3 is formed on an object surface in a telephoto state is generated. Additionally, the flash discharge tube 3 is horizontally long and may irradiate a necessary irradiation range laterally long. A plurality of cylindrical lenses parallel to the flash discharge tube 3 are thus formed on a light emitting unit side of the first optical member 1 in this embodiment. Forming the plurality of cylindrical lenses is capable of preventing the phenomenon described above, spreading an irradiation range along a vertical direction, and acquiring well-balanced in a horizontal and vertical directions and uniform light distribution characteristics. A power of the cylindrical lens may be weak compared to a conventional lens. It is thus possible to minimize loss of light quantity necessary for diffusion in the telephoto state, and an efficient optical system is configurable.

Figure 7:
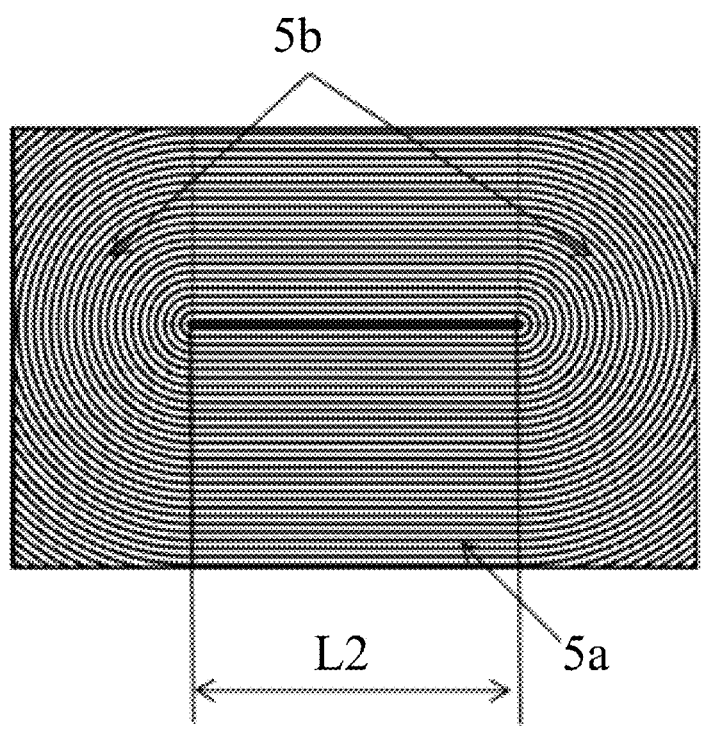
FIG. 7 is a schematic diagram illustrating a fresnel lens formed on a second optical member.

Next, a fresnel lens formed on a light emitting unit side of the second optical member 5 is explained in detail using FIG. 7. A fresnel shape formed on the light emitting unit side of the second optical member 5 (side facing to the fresnel shape formed on the object side of the first optical member 1) includes a first diffusing portion 5a and a second diffusing portion 5b. The first diffusing portion 5a is formed so as to only have light diffusing action relative to the direction perpendicular to the longitudinal direction of the flash discharge tube 3. The second diffusing portion 5b is annularly formed on both sides of the first diffusing portion 5a. A focal length of the fresnel lens formed on the first and second diffusing portions 5a and 5b is 20 mm. The first diffusing portion 5a may have diffusing action relative to the longitudinal direction of the flash discharge tube 3 if diffusing action relative to the direction perpendicular to the longitudinal direction of the flash discharge tube 3 is stronger than diffusing action relative to the longitudinal direction thereof. Irradiation angles are variable according to a focal length of the second optical member 5, but irradiation angles broaden and a guide number decreases if the focal length of the second optical member 5 is smaller than that of the first optical member 1. Conversely, irradiation angles narrow and an angle of view of a super wide angle lens is not satisfied if the focal length of the second optical member 5 is larger than that of the first optical member 1. In light of balance, focal lengths of fresnel lenses formed on the first and second optical members 1, 5 are preferably in a range of 15-35 mm. In this embodiment, the focal lengths of fresnel lenses formed on the first and second optical members 1, 5 are 22.5 mm and 20 mm, respectively, and they are approximately identified.

Additionally, a linear length L1 of the first condensing portion 1a and a linear length L2 of the first diffusing portion 5a are adjustable so as to satisfy an angle of view of a super wide angle lens in a horizontal direction. In this embodiment, the linear length L1 of the first condensing portion 1a is 17 mm, and the linear length L2 of the first diffusing portion 5a is 20 mm. In other words, a relationship of L2>L1 is satisfied. Conversely, if a relation of L2<L1 is satisfied, light is diffused in a horizontal direction and a guide number decreases. The linear length L1 of the first condensing portion 1a is preferably shorter than the linear length L2 of the first diffusing portion 5a.

Figure 8A:
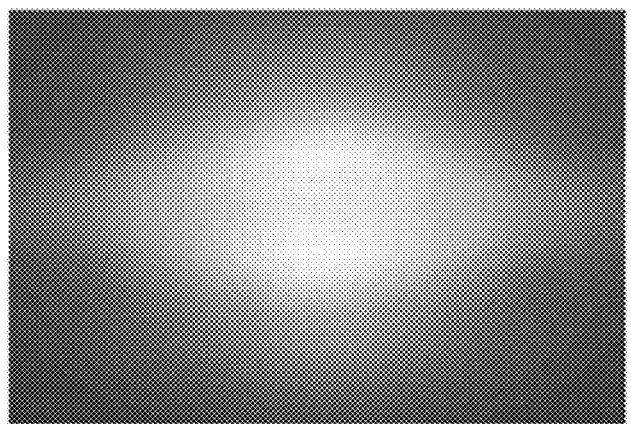
FIGS. 8A to 8C are optical simulation results before arranging a second optical member.
Figure 8B:
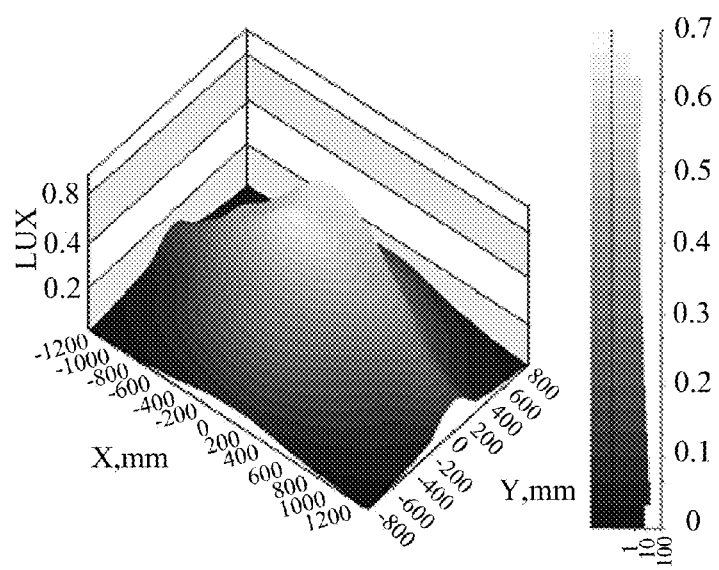
Figure 8C:
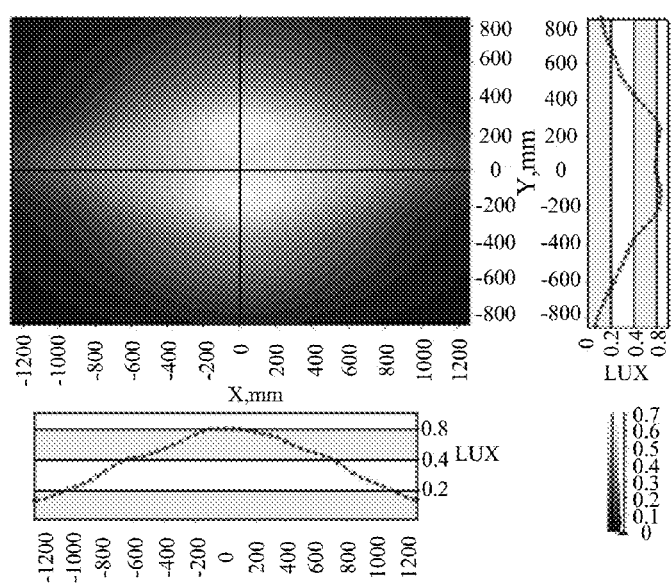
Figure 9A:
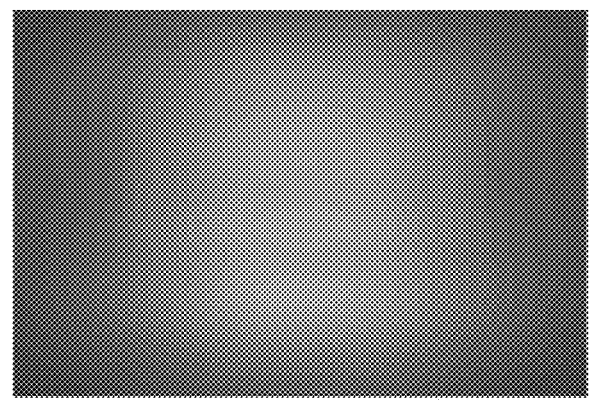
FIGS. 9A to 9C are optical simulation results after arranging the second optical member.
Figure 9B:
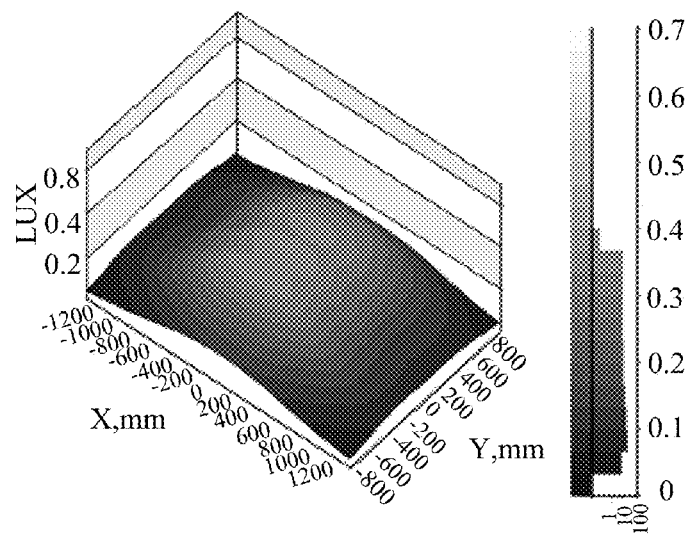
Figure 9C:
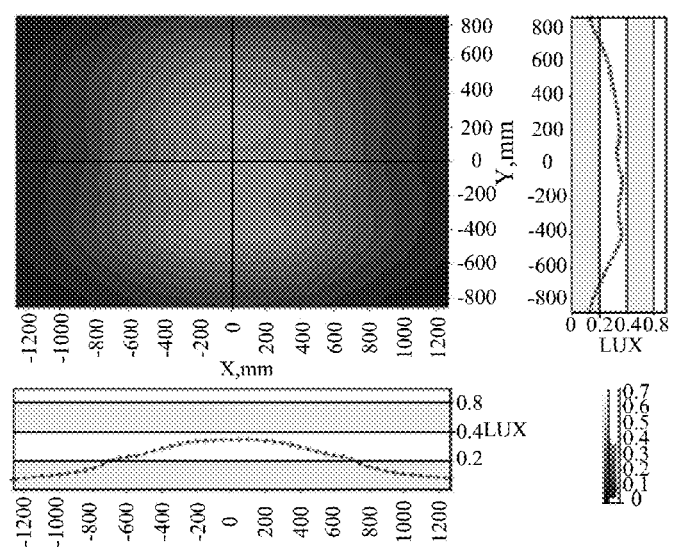
Figure 10A:
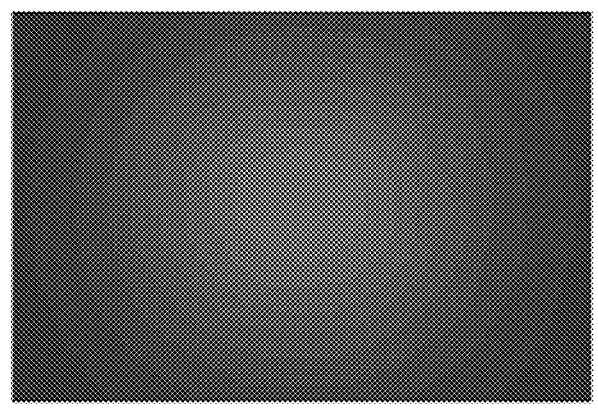
FIGS. 10A to 10C are optical simulation results after arranging a wide panel including a group of quadrangular pyramid protruding portions on which a diffusing process is carried out.
Figure 10B:
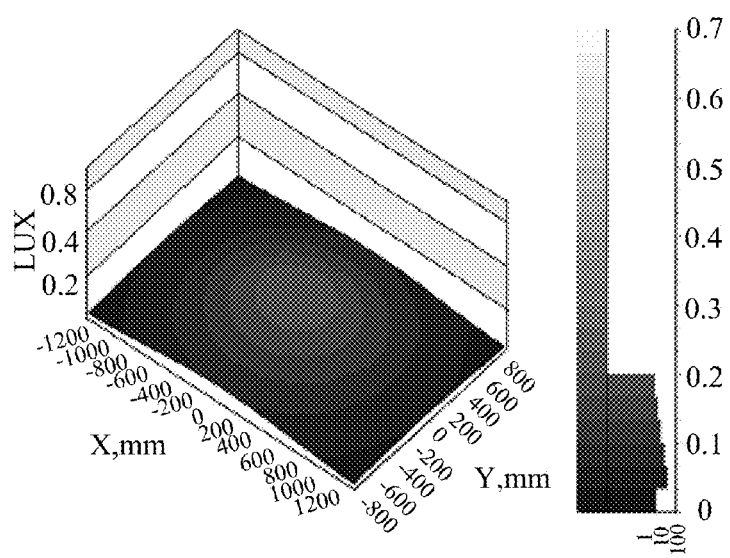
Figure 10C:
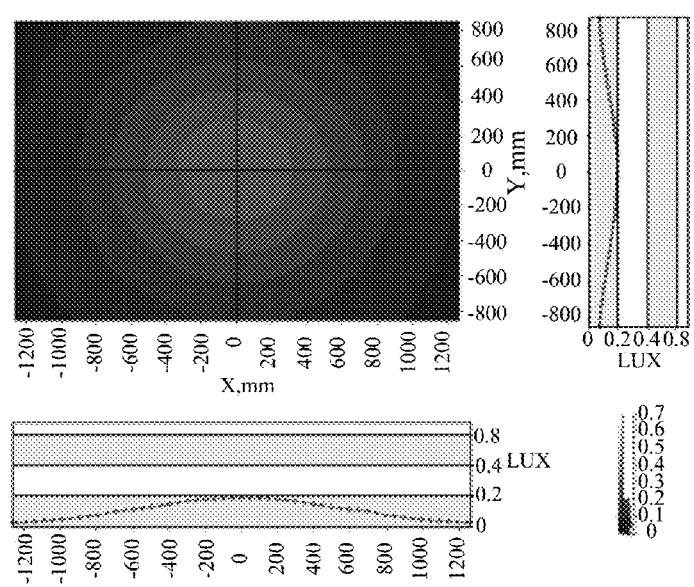

Next, optical simulation results performed in a wide state of the image pickup apparatus are explained using FIGS. 8A to 10C. FIGS. 8A to 8C are optical simulation results before arranging the second optical member 5, and FIGS. 9A to 9C are optical simulation results after arranging the second optical member 5. FIGS. 10A to 10C are optical simulation results after arranging a conventional wide panel including a group of quadrangular pyramid protruding portions on which a diffusing process is carried out. FIGS. 8A, 9A, and 10A are light distribution characteristics diagrams, FIGS. 8B, 9B, and 10B are light emitting intensity distribution charts in an XY plane, and FIGS. 8C, 9C, and 10C are contour drawings of light emitting intensity in X and Y directions. In each figure, light emitting intensity is represented as "LUX", but light emitting intensity of the flash apparatus is generally represented using a guide number. The following is thus described by representing light emitting intensity at a center of an XY plane as a guide number.

Irradiation angles necessary for an angle of view of a super wide angle lens having a focal length of 14 mm are 104.7 degrees in a horizontal direction, 81 degrees in a vertical direction, and 114 degrees in a diagonal direction. Then, in FIGS. 8A to 8C, irradiation angles are 114.4 degrees in a horizontal direction, 72.9 degrees in a vertical direction, and 78.3 degrees in a diagonal direction, and a guide number is 22.3. In other words, irradiation angles in vertical and diagonal directions necessary for an angle of view of a super wide angle lens are not acquired, and four corners significantly darken as illustrated in FIGS. 8A to 8C. In FIG. 10A to 10C, irradiation angles are 129.6 degrees in a horizontal direction, 125.6 degrees in a vertical direction, and 123.4 degrees in a diagonal direction, and a guide number is 12.6. In other words, irradiation angles necessary for an angle of view of a super wide angle lens are adequately acquired, but a guide number extremely decreases and luminance drops by about 70% compared to a state before arranging the wide panel. From this result, since a conventional quadrangular pyramid shape unnecessary diffuses light, luminance decreases. In this embodiment, an apex angle of a quadrangular pyramid shape is 60 degrees. Though irradiation angles and a guide number vary according to the apex angle of the quadrangular pyramid shape, it is the same that irradiation angles necessary for a super wide angle lens are adequately acquired, but a guide number extremely decreases. In FIGS. 9A to 9C, irradiation angles are 124.8 degrees in a horizontal direction, 96.9 degrees in a vertical direction, and 144 degrees in a diagonal direction, and a guide number is 16.9. In other words, irradiation angles necessary for a super wide angle lens have a margin of about 15 degrees in horizontal and vertical directions and a margin of about 30 degrees in a diagonal direction. Since an irradiation angle indicates an angle between lights being luminance at a center of 50%, having about 15 degrees as a margin of an irradiation angle is appropriate so as to be illuminated up to an end of a screen. Regarding luminance, a guide number dramatically improves compared to a result of a conventional wide panel on which a group of quadrangular pyramid shape protruding portions is formed (FIGS. 10A to 10C). Moreover, when comparing FIGS. 9A to 9C with FIGS. 10A to 10C, the whole screen is illuminated, light is irradiated to a rectangular shape corresponding to an angle of view, and dark regions of four corners decrease in size by arranging the second optical member 5.

As explained above, the illumination apparatus in this embodiment is capable of irradiating an angle of view corresponding to a super wide angle lens and improving a guide number.

Figure 11:
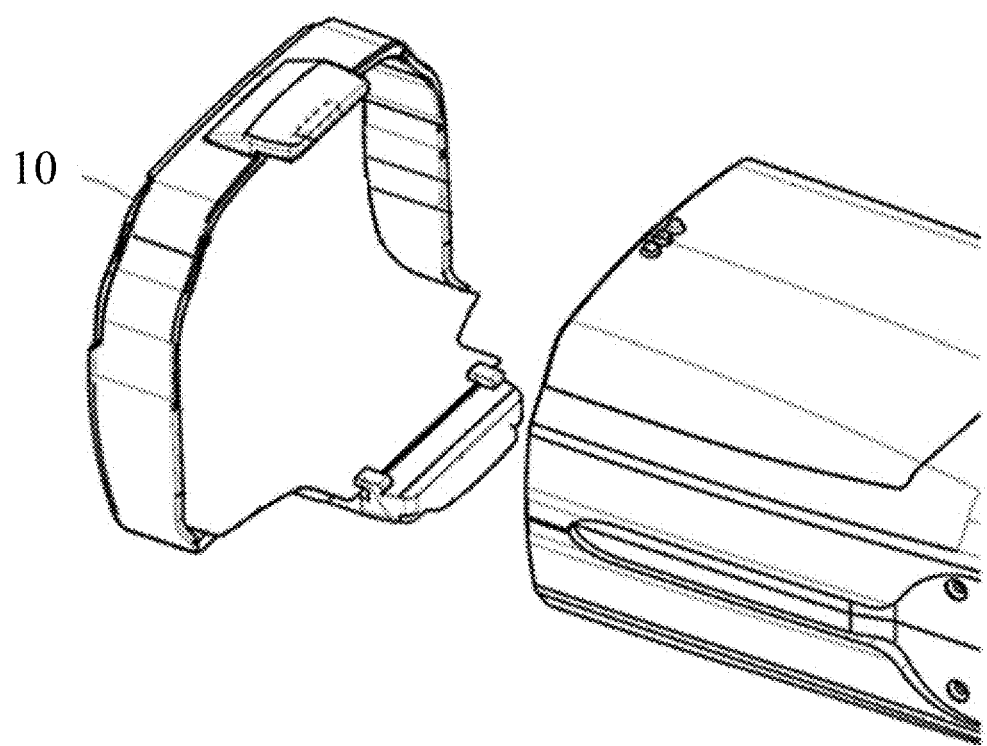
FIG. 11 is a perspective view of an optical accessory attachable to an illumination apparatus.

A wide panel is used as a second optical member in this embodiment, but a fresnel lens having diffusing action relative to a light diffusing adaptor may be used. In other words, a light diffusing adaptor being an optical accessory attachable to the illumination apparatus as illustrated in FIG. 11 may be applied to the invention. In particular, in a state where the optical accessory is attached to the illumination apparatus, a fresnel shape having light diffusing action may be formed on the optical accessory so as to face a first optical member arranged in front of the illumination apparatus.

Additionally, the first optical member 1 fixed to relative to the illumination apparatus may be configured by two optical panels. Condensing action is then realized by resultant power of two optical panels.

Additionally, the illumination apparatus may not include the protecting panel 4.

Additionally, the light emitting unit may use a plurality of light emitting diodes (LEDs) linearly arranged as a light source. Then, when directivity of the LEDs is strong and components other than components proceeding to the first optical member are little, the light emitting unit may not include the reflector.

Additionally, the illumination apparatus detachably attached to the image pickup apparatus is explained in this embodiment, but the invention may be applied to an illumination apparatus built in the image pickup apparatus, i.e., the image pickup apparatus incorporating the illumination apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-077485, filed on Apr. 4, 2014, which is hereby incorporated by reference herein in its entirety.

What is claimed is:

1. An illumination apparatus comprising:
a light emitting unit;
a first optical member arranged in front of the light emitting unit and including a first fresnel shape having condensing action; and
a second optical member including a second fresnel shape having light diffusing action so as to face the first fresnel shape of the first optical member,
wherein the second fresnel shape includes a first diffusing portion in which light diffusing action relative to a direction perpendicular to a longitudinal direction of the light emitting unit is stronger than light diffusing action relative to the longitudinal direction of the light emitting unit, and a second diffusing portion annularly formed on both sides of the first diffusing portion.

2. The illumination apparatus according to claim 1, wherein the first fresnel shape includes a first condensing portion in which condensing action relative to a direction perpendicular to a longitudinal direction of the light emitting unit is stronger than condensing action relative to the longitudinal direction of the light emitting unit, and a second condensing portion annularly formed on both sides of the first condensing portion.

3. The illumination apparatus according to claim 2, wherein a length of the first condensing portion taken along the longitudinal direction of the light emitting unit is shorter than a length of the first diffusing portion taken along the longitudinal direction of the light emitting unit.

4. The illumination apparatus according to claim 1, wherein the illumination apparatus varies irradiation angles according to relative distances between the light emitting unit and the first optical member.

5. The illumination apparatus according to claim 1, wherein the second optical member rotates between a first state in which the second optical member is arranged in front of the first optical member and a second state in which the second optical member is housed in the illumination apparatus according to relative distances between the light emitting unit and the first optical member.

6. The illumination apparatus according to claim 1, wherein focal lengths of fresnel lenses formed on the first and second optical members are in a range of 15-35 mm.

7. The illumination apparatus according to claim 1, wherein focal lengths of fresnel lenses formed on the first and second optical members are the same.

8. An image pickup apparatus comprising the illumination apparatus according to claim 1.

\* \* \* \* \*